US012605739B2

(12) United States Patent
Melvin

(10) Patent No.: US 12,605,739 B2
(45) Date of Patent: Apr. 21, 2026

(54) MODIFICATION OF INDIRECT-FIRED PAINT CURING OVEN ATMOSPHERIC ENVIRONMENT THROUGH THE INTRODUCTION OF GAS COMBUSTION PRODUCTS

(71) Applicant: Ford Motor Company, Dearborn, MI (US)

(72) Inventor: Mark Clinton Melvin, South Lyon, MI (US)

(73) Assignee: Ford Motor Company, Dearborn, MI (US)

( * ) Notice: Subject to any disclaimer, the term of this patent is extended or adjusted under 35 U.S.C. 154(b) by 468 days.

(21) Appl. No.: 17/882,282

(22) Filed: Aug. 5, 2022

(65) Prior Publication Data

US 2024/0042483 A1 Feb. 8, 2024

(51) Int. Cl.
*F27B 9/10* (2006.01)
*B05D 3/02* (2006.01)
*F26B 23/02* (2006.01)

(52) U.S. Cl.
CPC ............ *B05D 3/0272* (2013.01); *F26B 23/02* (2013.01)

(58) Field of Classification Search
CPC .......... F23G 2203/40; F27B 9/16; F27B 7/10; F27B 9/36; F27B 9/045; F27B 9/047; B05D 3/0413; F26B 21/028; F26B 21/14; F26B 21/04; F26B 2210/12; C23C 16/453
USPC ............................................................... 118/7
See application file for complete search history.

(56) References Cited

U.S. PATENT DOCUMENTS 4,336,789 A * 6/1982 Ogawa .................. F24C 15/322 126/21 A
4,516,012 A * 5/1985 Smith .................. F24C 15/322 219/400
4,662,840 A * 5/1987 Ellison .................. F27D 17/004 34/212
6,062,850 A * 5/2000 Ino .......................... F26B 3/283 432/143
6,451,930 B1 9/2002 Burgman et al.
7,144,631 B2 12/2006 Lin et al.
7,838,078 B2 11/2010 Lin
7,905,723 B2 * 3/2011 Klobucar ............. B05D 3/0254 432/147

(Continued)

FOREIGN PATENT DOCUMENTS

CN 105195372 A * 12/2015
CN 107667270 A * 2/2018 ........... B05D 3/0413

(Continued)

*Primary Examiner* — Gregory A Wilson
(74) *Attorney, Agent, or Firm* — Burris Law, PLLC

(57) ABSTRACT

A system for thermally treating components includes an indirect-fired oven, the indirect-fired oven having an internal chamber configured to house the components and an air intake in fluid communication with the internal chamber. A source of heat is disposed external to the internal chamber of the indirect-fired oven, and a combustion source is disposed external to the internal chamber of the indirect-fired oven and is configured to generate gas combustion products. An exhaust line is in fluid communication with the internal chamber of the indirect-fired oven, and the gas combustion products are introduced into the internal chamber of the indirect-fired oven.

17 Claims, 2 Drawing Sheets

(56) References Cited

U.S. PATENT DOCUMENTS

Figure 1:
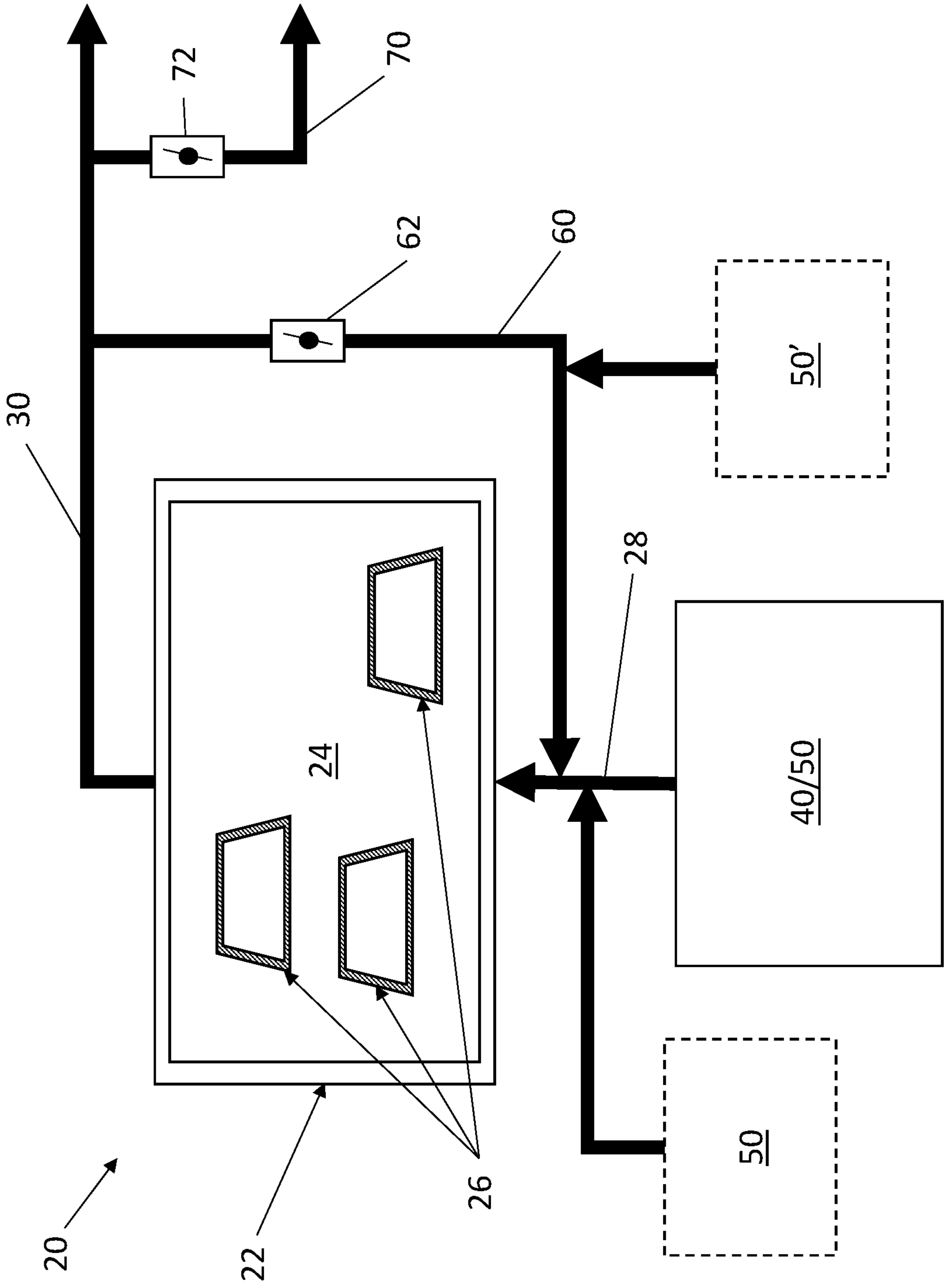

2009/0017408 A1 * 1/2009 Pakkala .................. F26B 3/305
34/267

FOREIGN PATENT DOCUMENTS

| | | | | |
|---|---|---|---|---|
| CN | 210474559 | U | * | 5/2020 |
| JP | H1054665 | A | * | 2/1998 |

* cited by examiner

MODIFICATION OF INDIRECT-FIRED PAINT CURING OVEN ATMOSPHERIC ENVIRONMENT THROUGH THE INTRODUCTION OF GAS COMBUSTION PRODUCTS

FIELD

The present disclosure relates to thermal treatment systems, and in particular to fired and indirect-fired oven systems for paint curing.

BACKGROUND

The statements in this section merely provide background information related to the present disclosure and may not constitute prior art.

Various types of ovens are used to thermally treat components, including to cure coatings such as paint on parts of a motor vehicle. More specifically, motor vehicle parts include decorative and protective paint and topcoats that are thermally treated to cure the material/polymer within the paint and topcoats.

A typical oven for motor vehicle part applications uses combustion fuel to produce the necessary amount of heat. The heat produced by combustion is used to heat air which enters the oven chamber with the motor vehicle parts. In a direct-fired oven, the combustion heat is applied directly to the heated air within the oven chamber, mixing combustion gases with the air. In contrast, indirect-fired ovens use a heat exchanger to heat the air indirectly, without mixing combustion gases with the heated air within the oven chamber. Indirect-fired ovens provide some benefits over direct-fired ovens, particularly in temperature control. However, indirect-fired ovens do not consistently provide the desired surface chemical properties for proper adhesion, especially to windshield glass.

The present disclosure addresses the challenges related to proper adhesion of painted/coated parts to windshield glass within a heated oven environment, among other substrates.

SUMMARY

This section provides a general summary of the disclosure and is not a comprehensive disclosure of its full scope or all of its features.

The present disclosure provides a system for thermally treating components. The system includes an indirect-fired oven, the indirect-fired oven having an internal chamber configured to house the components and an air intake in fluid communication with the internal chamber. A combustion heater is disposed external to the internal chamber of the indirect-fired oven, and is configured to generate gas combustion products. The combustion heater is in fluid communication with the internal chamber of the indirect-fired oven. An exhaust line is in fluid communication with the internal chamber of the indirect-fired oven, and the gas combustion products are introduced into the internal chamber of the indirect-fired oven.

In variations of this form, which may be implemented individually or in any combination: the system further includes a return line in fluid communication with the internal chamber of the indirect-fired oven and the combustion heater, the return line including a flow control valve; the combustion source is disposed external to the internal chamber of the indirect-fired oven and configured to generate gas combustion products; the combustion source is in fluid communication with the return line; an auxiliary exhaust line is in fluid communication with the internal chamber of the indirect-fired oven and the exhaust line, the auxiliary exhaust line including a flow control valve configured to balance a mass flow rate from the introduction of gas combustion products into the internal chamber of the indirect-fired oven; and the combustion source is in fluid communication with the air intake.

The present disclosure further provides a system for thermally treating components which includes an indirect-fired oven, the indirect-fired oven having an internal chamber configured to house the components and an air intake in fluid communication with the internal chamber. A source of heat is disposed external to the internal chamber of the indirect-fired oven, and a combustion source is disposed external to the internal chamber of the indirect-fired oven and is configured to generate gas combustion products. The combustion source is in fluid communication with the air intake. An exhaust line is in fluid communication with the internal chamber of the indirect-fired oven, and the gas combustion products are introduced into the internal chamber of the indirect-fired oven.

In variations of this form, which may be implemented individually or in any combination: the source of heat is a combustion heater that provides the combustion source; the combustion source is a hot water generator or a thermal oxidizer; the return line including a flow control valve; the combustion source is disposed external to the internal chamber of the indirect-fired oven and configured to generate gas combustion products; the combustion source is in fluid communication with the return line; an auxiliary exhaust line is in fluid communication with the internal chamber of the indirect-fired oven and the exhaust line, the auxiliary exhaust line including a flow control valve and configured to balance a mass flow rate from the introduction of gas combustion products into the internal chamber of the indirect-fired oven; and the combustion source is in fluid communication with the air intake.

The present disclosure also provides a method including placing at least one component into an internal chamber of an indirect-fired oven, externally heating a fluid and providing the heated fluid through an air intake, and directing gas combustion products into the internal chamber of the indirect-fired oven. The air intake is in fluid communication with the internal chamber of the indirect-fired oven.

In variations of this form, which may be implemented individually or in any combination: the gas combustion products are generated by the external heating; the gas combustion products are generated by an external combustion source; the external combustion source is a hot water generator or a thermal oxidizer; the gas combustion products are generated by the external heating and an external combustion source; the gas combustion products react with a coating on the component, thereby improving adhesion; the component is a motor vehicle component and the coating is paint; and the method further includes balancing a mass flow rate of gas through the internal chamber of the indirect-fired oven from the introduction of gas combustion products.

Further areas of applicability will become apparent from the description provided herein. It should be understood that the description and specific examples are intended for purposes of illustration only and are not intended to limit the scope of the present disclosure.

DRAWINGS

Figure 2:
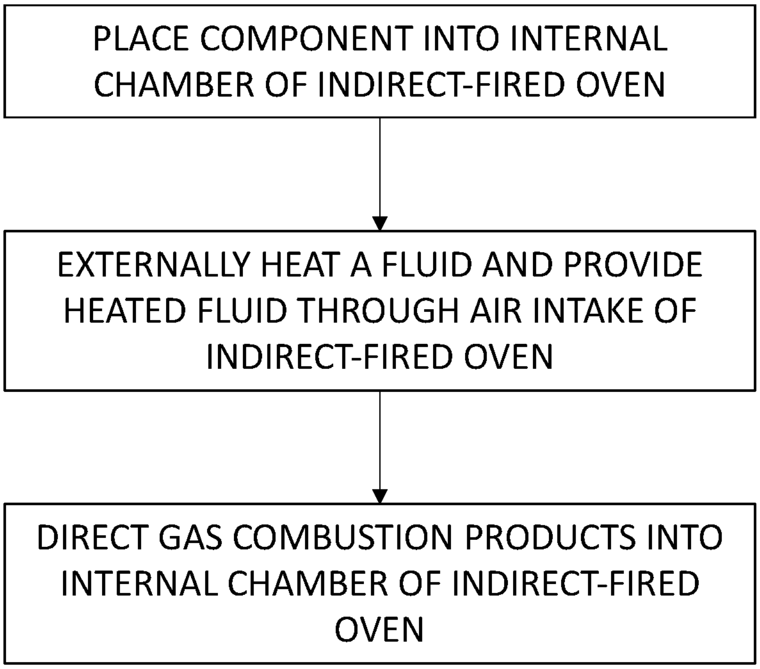

In order that the disclosure may be well understood, there will now be described various forms thereof, given by way of example, reference being made to the accompanying drawings, in which:

FIG. 1 is a schematic view of a system for thermally treating a component, or multiple components, according to the teachings of the present disclosure; and FIG. 2 is a flow diagram illustrating a method of thermally treating a component, or multiple components, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a system for thermally treating components is illustrated and generally indicated by reference numeral 20. The system 20 includes an indirect-fired oven 22 with an internal chamber 24 configured to house at least one component, such as by way of example a component 26 (or multiple components) of a motor vehicle. One such example of the component 26 may be a pillar, a cross-member, or a frame that is configured to be joined with an adjacent substrate, such as a windshield glass (not shown). A coating, such as by way of example paint or a topcoat layer, is pre-applied to the component 26 and is cured within the indirect-fired oven 22.

The system 20 further includes an air intake 28 and an exhaust line 30, both of which are in fluid communication with the internal chamber 24 of the indirect-fired oven 22 as shown. The system 20 also includes a source of heat 40 external to the internal chamber 24 of the indirect-fired oven 22. Because the source of heat 40 is external to the internal chamber 24, the oven is by definition indirectly fired, as opposed to a direct-fired oven that has a source of heat disposed within the internal chamber 24. The source of heat 40 is configured to generate heat to heat a fluid, such as air. The heated fluid then flows through the air intake 28 and into the internal chamber 24. In one form, the source of heat 40 is a combustion heater. The exhaust line 30 provides a means to exhaust heated air from the internal chamber 24 of the indirect-fired oven 22 during operation.

As further shown, the system 20 includes a combustion source 50. The combustion source 50 is also external to the internal chamber 24 and in one form is in fluid communication with the air intake 28. In another form, the combustion source 50 is in direct fluid communication with the internal chamber 24. The combustion source 50 is configured to generate gas combustion products, which are advantageously introduced into the internal chamber 24 of the indirect-fired oven 22. The gas combustion products may include, among other components, nitrogen oxides, aldehydes, carbon monoxide, carbon dioxide, and/or water vapor, among others. In addition, the gas combustion produces thermal energy, which in one form is used to provide additional heat to the internal chamber 24, thereby improving the thermal efficiency and fuel efficiency of the system 20. It should be understood, although not shown, that a separate intake may be employed to introduce the gas combustion products into the internal chamber 24. In this form, the heated air and the gas combustion products are introduced into the internal chamber 24 through separate lines/conduits.

In one form of the present disclosure, the source of heat 40 and the combustion source 50 are one in the same, for example, a combustion heater as set forth above. However, in another form, the source of heat 40 is separate from the combustion source 50. By way of example, the source of heat 40 may be a combustion heater, and the combustion source 50 is another component within an industrial plant, such as a hot water generator or the thermal oxidizer (using the clean exhaust), among others. Rather than exhausting gas combustion products from the combustion source 50, conventionally a combustion heater, to atmosphere, these gas combustion products are introduced into the internal chamber 24 of the indirect-fired oven 22. Remarkably, the inventors have discovered that introduction of gas combustion products into the internal chamber 24 of the indirect-fired oven 22 improves adhesion of the component(s) 26 to a substrate, such as by way of example a vehicle frame to a glass windshield.

As further shown, in one variation of the present disclosure, a return line 60 is in fluid communication with the internal chamber 24 and the source of heat 40. The return line 60 generally provides fluid communication between the exhaust line 30 and the air intake 28, thus reducing fresh air requirements for entering the system 20. A flow control valve 62 in the return line 60 provides a means to control the amount of return gas, thus balancing the overall flow through the system 20. When the system 20 includes the optional return line 60, the combustion source 50' may be in fluid communication with the return line 60. In yet another form not shown, multiple combustion sources 50 are employed to provide the requisite amount of gas combustion products into the internal chamber 24 of the indirect-fired oven 22.

In another form, the system 20 includes an auxiliary exhaust line 70 in fluid communication with the internal chamber 24 and the exhaust line 30. The auxiliary exhaust line 70 similarly includes a flow control valve 72 and is configured to balance the mass flow of gas (e.g., rate) from the introduction of gas combustion products into the internal chamber 24. More specifically, with the introduction of gas combustion products into the internal chamber 24, a total mass flow of gas is higher and thus some amount of gas may need to be exhausted or removed from the internal chamber 24 so that the mass flow of gas into the internal chamber 24 is not too high. However, it should be understood that this mass flow balancing of gas into and out of the internal chamber 24 is optional.

Advantageously, the gas combustion products react with the coating on the component 26 to improve the surface chemistry of the coating. The improved surface chemistry results in improved adhesion between the coated component and other components, such as by way of example, a glass windshield.

Now referring also to FIG. 2, a process for thermally treating a component is shown. The process begins with placing at least one component into the internal chamber 24 of the indirect-fired oven 22. Next, a fluid (e.g., air) is externally heated and provided through the air intake 28. As set forth above, the air intake 28 is in fluid communication with the internal chamber 24 of the indirect-fired oven 22. Next, gas combustion products are directed into the internal chamber 24 of the indirect-fired oven 22.

As set forth above, the gas combustion products may be generated by the external heating, by a separate external combustion source, or a combination of both. Advantageously, the gas combustion products react with a coating (e.g., paint, topcoat layer) on the component, thereby improving adhesion with an adjacent substrate, such as a glass windshield.

Further, one form of the method includes balancing a mass flow rate of gas through the internal chamber 24 of the indirect-fired oven 22 from the introduction of gas combustion products. This may be accomplished, by way of example, with the flow control valves as set forth above.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for thermally treating components, the system comprising:

an indirect-fired oven, the indirect-fired oven comprising:
  an internal chamber configured to house the components; and
  an air intake in fluid communication with the internal chamber;
a combustion heater disposed external to the internal chamber of the indirect-fired oven, the combustion heater configured to generate gas combustion products, the combustion heater being in fluid communication with the internal chamber;
a return line in fluid communication with the internal chamber of the indirect-fired oven and the combustion heater, the return line comprising a flow control valve; and
an exhaust line in fluid communication with the internal chamber of the indirect-fired oven,
wherein the gas combustion products are introduced into the internal chamber of the indirect-fired oven, the gas combustion products chemically reacting with a coating on the components, thereby improving adhesion.

2. The system according to claim 1, further comprising a combustion source disposed external to the internal chamber of the indirect-fired oven and configured to generate gas combustion products, the combustion source in fluid communication with the return line.

3. The system according to claim 1 further comprising an auxiliary exhaust line in fluid communication with the internal chamber of the indirect-fired oven and the exhaust line, the auxiliary exhaust line comprising a flow control valve and configured to balance a mass flow rate from the introduction of gas combustion products into the internal chamber of the indirect-fired oven.

4. The system according to claim 1, wherein the combustion source is in fluid communication with the air intake.

5. A system for thermally treating components, the system comprising:

an indirect-fired oven, the indirect-fired oven comprising:
  an internal chamber configured to house the components; and
  an air intake in fluid communication with the internal chamber;
a source of heat disposed external to the internal chamber of the indirect-fired oven;
a combustion source disposed external to the internal chamber of the indirect-fired oven and configured to generate gas combustion products, the combustion source in fluid communication with the internal chamber;
a return line in fluid communication with the internal chamber of the indirect-fired oven and the combustion heater, the return line comprising a flow control valve; and
an exhaust line in fluid communication with the internal chamber of the indirect-fired oven,
wherein the gas combustion products are introduced into the internal chamber of the indirect-fired oven, the gas combustion products chemically reacting with a coating on the components, thereby improving adhesion.

6. The system according to claim 5, wherein the source of heat is a combustion heater that provides the combustion source.

7. The system according to claim 5, wherein the combustion source is selected from the group consisting of a hot water generator and a thermal oxidizer.

8. The system according to claim 5, wherein the combustion source is in fluid communication with the return line.

9. The system according to claim 5 further comprising an auxiliary exhaust line in fluid communication with the internal chamber of the indirect-fired oven and the exhaust line, the auxiliary exhaust line comprising a flow control valve and configured to balance a mass flow rate from the introduction of gas combustion products into the internal chamber of the indirect-fired oven.

10. The system according to claim 5, wherein the combustion source is in fluid communication with the air intake.

11. A method of thermally treating components, the method comprising:

placing at least one component into an internal chamber of an indirect-fired oven;
externally heating a fluid and providing the heated fluid through an air intake, the air intake in fluid communication with the internal chamber of the indirect-fired oven;
directing gas combustion products into the internal chamber of the indirect-fired oven, the gas combustion products chemically reacting with a coating on the components, thereby improving adhesion; and
balancing a mass flow rate of gas through the internal chamber of the indirect-fired oven.

12. The method according to claim 11, wherein the gas combustion products are generated by the external heating.

13. The method according to claim 11, wherein the gas combustion products are generated by an external combustion source.

14. The method according to claim 13, wherein the fluid in the gas combustion products provide additional heat to the internal chamber of the indirect-fired oven.

15. The method according to claim 11, wherein the gas combustion products are generated by the external heating and an external combustion source.

16. The method according to claim 11, wherein the components are motor vehicle components and the coating is paint.

17. The method according to claim 11, wherein the gas combustion products are selected from the group consisting of nitrogen oxides, aldehydes, carbon monoxide, carbon dioxide, and water vapor.

* * * * *